Feb. 18, 1964 — W. O. RUSSELL — 3,121,424
OUTDOOR COOKING APPARATUS
Filed May 4, 1961 — 3 Sheets-Sheet 1
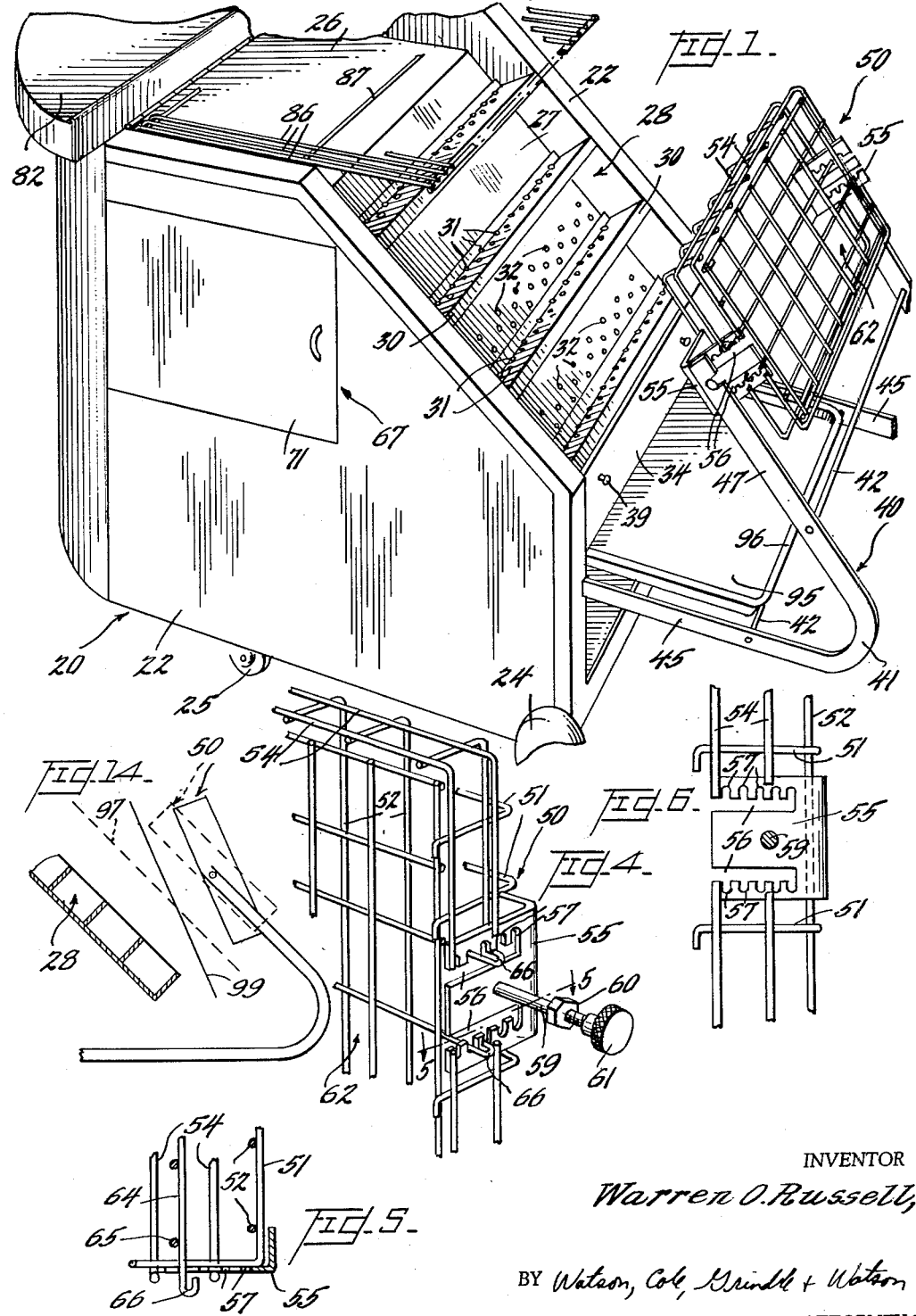
INVENTOR
Warren O. Russell,
BY Watson, Cole, Grindle & Watson
ATTORNEYS

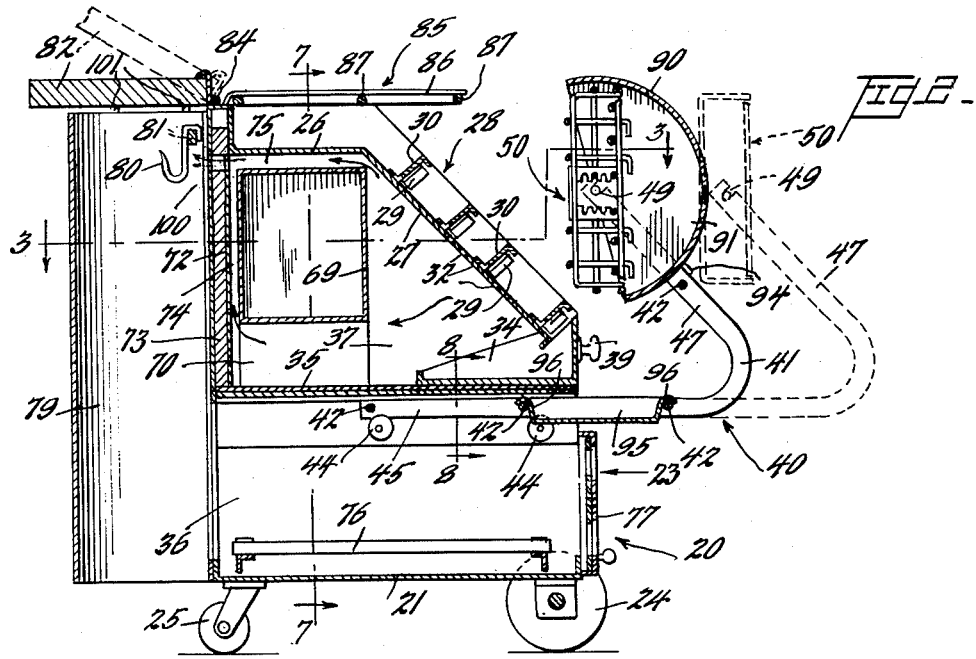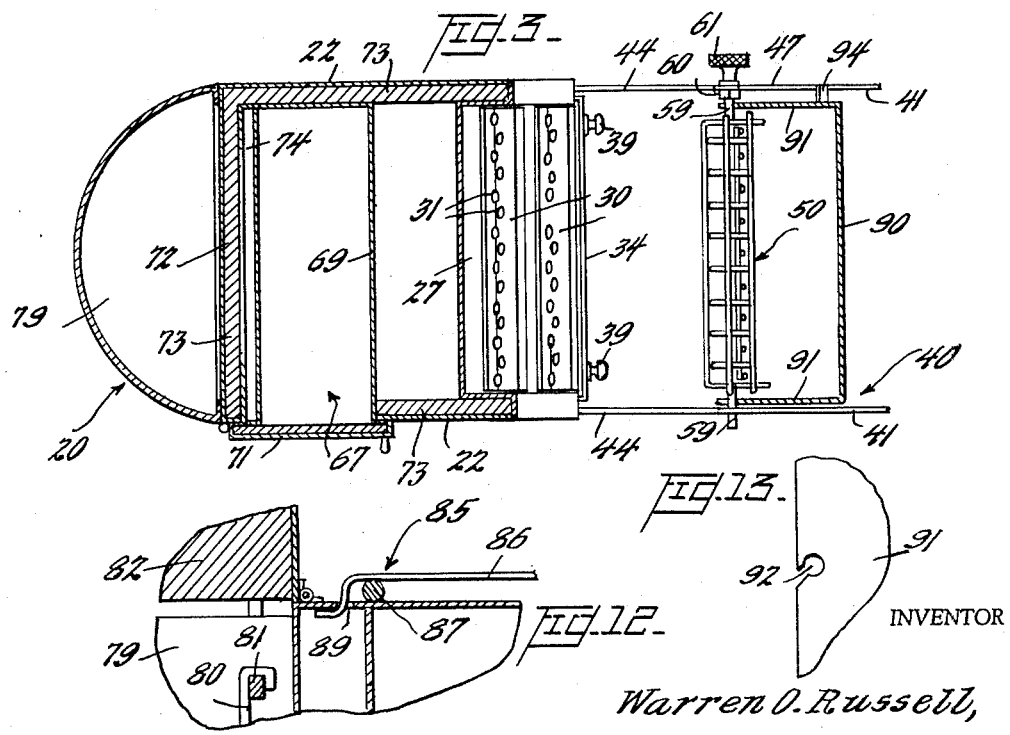

Feb. 18, 1964 W. O. RUSSELL 3,121,424
OUTDOOR COOKING APPARATUS
Filed May 4, 1961 3 Sheets-Sheet 3
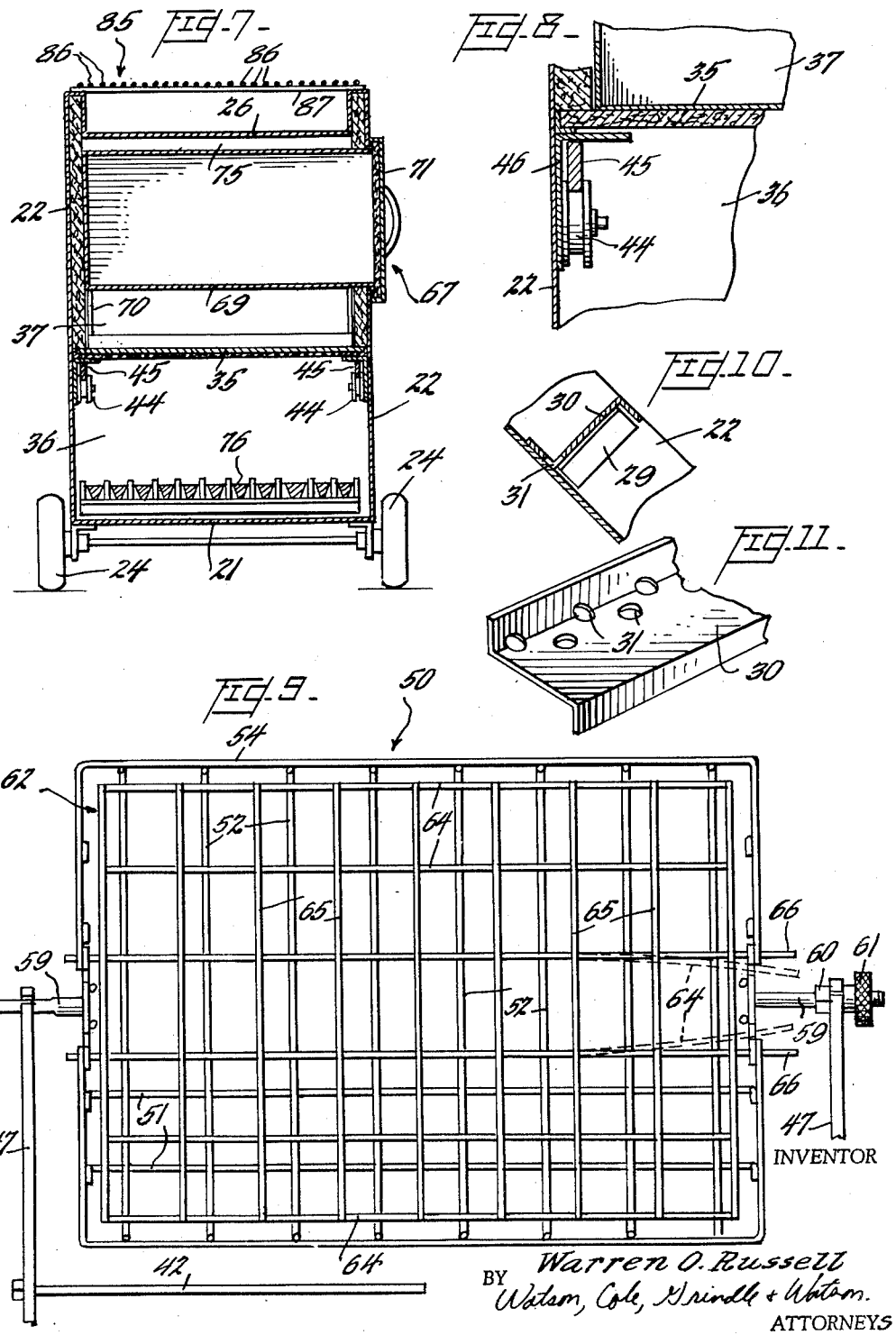
INVENTOR
Warren O. Russell
BY Watson, Cole, Grindle & Watson.
ATTORNEYS United States Patent Office 3,121,424
Patented Feb. 18, 1964

3,121,424
OUTDOOR COOKING APPARATUS
Warren O. Russell, Post Office, Rangeley, Maine
Filed May 4, 1961, Ser. No. 107,823
9 Claims. (Cl. 126—25)

This invention relates to outdoor cooking apparatus and more particularly to apparatus of this type which may be made to be portable, if desired, and conveniently constructed and arranged for use outdoors in both urban and suburban areas.

Summer cookouts have achieved tremendous popularity in recent years. The simplest form of apparatus at present utilized is usually a charcoal brazier which comprises a shallow pan for containing the charcoal, supported upon a tripod and provided with an open mesh grille for supporting the comestibles to be cooked. More elaborate embodiments of these devices may provide a rotisserie which finds utility in the cooking of comestibles of a thicker and more rounded configuration, such as roasts and fowl. However, apparatus of this type makes no provision for cooking operations such as baking, roasting, and warming. If the meal being prepared includes items which must be baked or roasted or which must be either warmed or kept warm after a cooking operation, then these operations must perforce be performed indoors. The disadvantages inherent in preparing portions of a complete meal in two different locations are, of course, obvious.

It is therefore a primary object of this invention to provide a novel and improved apparatus of the character described which will efficiently cook food of many varieties, whether the cooking process involves broiling, baking, roasting, stewing, boiling, frying, or other processes.

It is another object of this invention to provide an outdoor cooking apparatus which takes advantage of the natural tendency of the hot convection gases from the source of heat to rise in order to control the application of heat to the comestibles being warmed or cooked.

It is a further object of this invention to provide an outdoor cooking apparatus provided with novel and ingenious provisions for the utilization of the radiant heat emitted by the heat source.

It is a still further object of this invention to provide a compact outdoor cooking apparatus with which various cooking operations can be simultaneously performed without interference from each other.

It is yet another object of this invention to provide a portable outdoor cooking apparatus which may be closed into a compact unit and rolled to a storage location when not in use.

With these and other objects in view, the present invention contemplates a cabinet provided with a firebox therein. An oven for roasting and baking, and a level stove surface for frying, boiling and simmering are also provided in the cabinet. The apparatus further includes a novel adjustable supporting grid for holding meat products of widely diverse kinds in regulatable proximity to the firebox. The firebox and cabinet structure are so constructed and arranged that a fire in the firebox will efficiently function as a source of heat for any and all of the aforementioned cooking units. The various elements of the invention are constructed so that the entire apparatus may be closed up into a compact unit. Wheels are provided on the cabinet for conveniently moving the apparatus to or from a place of storage.

Other objects, advantages and novel features of the invention, including various constructional features of the firebox, cabinet, and supporting and angular adjustment elements of the grid structure, will become readily apparent upon consideration of the following detailed description when read in conjunction with the accompanying drawings wherein:

FIGURE 1 is a fragmentary perspective view of an outdoor cooking apparatus embodying the principal features of the present invention;

FIGURE 2 is a vertical longitudinal median section, slightly reduced, through the apparatus of FIGURE 1 and illustrates the relative arrangement of the various cooking units in and on the cabinet;

FIGURE 3 is a sectional view taken along the line 3—3 of FIGURE 2;

FIGURE 4 is a fragmentary perspective view of the adjustable broiler grille;

FIGURE 5 is a sectional view taken along the line 5—5 of FIGURE 4 and illustrates certain constructional details of the grille;

FIGURE 6 is a fragmentary end view of the grille of FIGURE 4;

FIGURE 7 is a sectional view taken along the line 7—7 of FIGURE 2 illustrating the oven arrangement and wood fire grate;

FIGURE 8 is a sectional view taken along the line 8—8 of FIGURE 2 looking in the direction of the arrows and illustrates details of the sliding carriage arrangement which supports the adjustable broiler;

FIGURE 9 is an enlarged elevational view of the adjustable grille of FIGURE 4;

FIGURES 10 and 11 are sectional and perspective views, respectively, showing constructional details of the firebox;

FIGURE 12 is a sectional view showing the mounting arrangement for the level cooking surface;

FIGURE 13 is a fragmentary end view of the heat shield which accompanies the adjustable grille and illustrates the notch arrangement provided for mounting the shield on the grille; and FIGURE 14 is a schematic representation of the firebox and broiler showing the proper positioning of the broiler relative to the firebox to insure uniform application of heat to the contained meat.

Attention now is directed to the drawings wherein like numerals of reference designate like parts throughout the several views and with particular reference to FIGURES 1, 2, 3 and 7. The cooking apparatus of the present invention comprises a cabinet designated generally by the reference numeral 20 and comprises a base 21 and preferably insulated side walls 22. A pair of fixed axis wheels 24 and a pair of caster wheels 25 are mounted on the base 21 and serve to facilitate movement of the apparatus to and from storage.

The top of the cabinet 20 is comprised generally of a metal sheet having a horizontal plate portion 26 and an inclined plate portion 27 is secured to or formed integrally with the side wall structure 22 adjacent the upper extremities thereof. The upper portions of side walls 22 are sloped along lines parallel to the plate 27 as is best seen in FIGURES 1 and 2. The upper extremities of the side walls 22 and the plate 27 define a firebox which is designated generally by the reference numeral 28, the upper portions of the side walls 20 forming the sides of the firebox and plate 27 the inclined bottom thereof. A plurality of L-shaped grate support brackets 29 (FIGURE 10) are welded or otherwise secured at spaced intervals along the inner sides of the walls 22 and adjacent plate 27. A plurality of Z-shaped grates 30 are provided to form the firebox 28 in conjunction with the upper ends of the side walls 22 and the plate 27. The grates 30 rest upon the brackets 29 and against the plate 27. Each of the grates 30 is provided with a plurality of apertures 31 (FIGURE 11) to provide adequate draft for the fuel to be burned on the grates. The plate 27 is provided with a plurality of perforations 32 (FIGURES 1 and 2) to permit passage of hot gases through the plate 27 for a purpose which will be explained later. An ash bin or tray 34 is provided beneath the lower extremity of the plate 27 to catch ashes which fall through the apertures 31 and perforations 32. The bin 34 is slidable along the top surface of a partition 35 which divides the cabinet 20 into two compartments 36 and 37. The bin 34 may be withdrawn from the compartment 37 through an opening in the front wall of the apparatus, which wall is given the general designation 23, by means of handles 39 in order to empty the bin.

A broiler or grille carriage, designated generally by the reference numeral 40, is formed of a pair of substantially V-shaped members 41 which are held in fixed relationship by means of cross braces 42. A pair of rollers 44 is mounted on the inside of each of the side walls 22 and serve to support horizontal segments 45 of the V-shaped members 41. The segments 45 are in sliding engagement with the underside of angle brackets 46 (FIGURE 8) secured to the side walls 22 which serves to retain them on the rollers 44. This arrangement permits the carriage to be moved in and out as desired.

The other segments 47 of the members 41 are inclined parallel to the plane of the firebox as may be best seen in FIGURE 2. The upper extremities of the segment 47 are provided with notches 49 which serve as pivots for a grille or broiler which will now be described.

Referring now to FIGURES 4 to 6 and 9, it can be seen that the broiler or grille, designated generally by the reference numeral 50, comprises a grid like structure formed of horizontal rods 51 and vertical rods 52 all welded or otherwise suitably secured together. The extremities of the rods 51 and 52 are all bent at right angles to the grid and are coupled together by means of side rods 54 welded thereto to form the sides of the basket like broiler. The center sections of the vertical portions of the side rods 54 are cut away and brackets 55 are welded to the ends thereof. Each of the brackets 55 is provided with a pair of slots 56 perpendicular to the plane of rods 51 and 52. The outer sides of each of the slots 56 are provided with uniformly spaced notches 57. Each bracket 55 also mounts a pivot pin 59. The pivot pins 59 serve to support the broiler 50 when placed in the notches 49 of the carriage members 41. Hex nuts 60 and knurled nuts 61 are provided for clamping the broiler 50 in any of a plurality of pivotal positions with respect to the carriage members 41.

A broiler closure member, designated generally by the reference numeral 62, is provided for the broiler 50 and comprises a flat grid formed of horizontal rods 64 and vertical rods 65 welded or otherwise secured together. The two central rods 64 (FIGURE 9) extend beyond the outer rods 65 and are provided with reverse bend portions 66 on the extremities thereof. The central rods 64 are not secured to the outer two vertical rods 65 at either end of the closure member 62 in order to facilitate flexing thereof for a purpose which will be subsequently described.

An oven (FIGURES 2 and 7) designated generally by the reference numeral 67, is provided in the compartment 37. The oven comprises a rectangular metal box 69 supported at its outer end by one of the side walls 22 and at its other end by a supporting plate 70. An oven door 71 is mounted, by means of hinges, on the side wall 22 adjacent the open end of the oven and serves to permit access to the oven. It should be noted that the oven is spaced from a rear wall 72 of the compartment 37 and the plate 26 to provide air spaces 74 and 75, respectively, the function of which will be described later. It will be noted that both of the side walls 22 and the rear walls 72 may be provided with insulation suggested at 73.

A grate 76 is mounted within the cabinet 20 on the bottom of the compartment 36 to accommodate a wood fire for meat smoking purposes. A damper structure 77 forms a major portion of the front wall 23 adjacent the compartment 36 and may be utilized to control the draft for the wood fire. A rear compartment 79 in the cabinet 20 communicates directly with the compartment 36 to provide a flue for fires within the compartment 36. A plurality of hooks 80 are suspended within the flue 79 by means of a support rod 81 and serve to support meat to be smoked within the flue 79. A flue cover 82 is secured to the top of the cabinet 20 by means of a hinge 84 so that it may be pivoted to an upright position to open the flue when smoking is being performed.

A horizontal cooking surface is provided by means of a grille designated generally by the reference numeral 85. The grille 85 comprises parallel longitudinal rods 86 welded or otherwise secured to transverse rods 87. The inner extremities of some of the rods 86 are bent as shown in FIGURE 12 and positioned within apertures 89 formed in the top of the wall 72 to retain the grille 85 in position as shown. The transverse rods 87 are made sufficiently long so that the extremities of certain of them engage the tops of the side walls 22 (FIGURE 7). The grille 85 is made sufficiently long so that a portion thereof projects out over the firebox 28.

Operation

In order that a better understanding of the invention may be had, its mode of operation will now be described.

The firebox 28 is loaded with a suitable fuel, such as charcoal briquettes, or even provided with a source of gaseous or electric heat, which is then ignited. The carriage 40 is withdrawn to the position shown in dotted lines in FIGURE 2 and the broiler 50 locked in a horizontal position by means of the nuts 60 and 61 with the open side of the broiler facing upwardly. The meat to be broiled is then placed in the broiler 50 and the closure member 62 applied to the top thereof. The reverse bend portions 66 of the central rods 64 are then moved toward each other by hand to the positions shown in dotted lines in FIGURE 9. The closure member 62 is then pressed downwardly against the meat with the extremities of the central rods 64 entering the slots 56. The portions 66 are then released and the extremities of the central rods 64 will then snap into the notches 57 with which they are aligned. The meat is then firmly held within the broiler 50 and is ready to be cooked.

A semicylindrical reflector 90 having a polished inner surface is provided for the purpose of minimizing heat loss by reradiation of heat by the meat within the broiler 50 as it is being cooked. The ends of the reflector 90 are closed by means of semicircular end plates 91. The end plates 91 are provided with notches 92 (FIGURE 13) which slip over the pivot pins 59 when the reflector is placed over the broiler 50. To prevent the reflector 90 from pivoting to its lowermost position with the open side facing upwardly, a lug 94 (FIGURE 3) is secured to one of the end plates 91 and is adapted to engage the adjacent segment 47 of the member 41. This serves to hold the reflector 90 in the position shown in FIGURE 2. A drip pan 95 is then placed on the carriage 40 beneath the broiler 50 to catch any juices dripping from the cooking meat. The pan is provided with overhanging lip portions 96 which engage two adjacent cross braces 42 to suspend the pan therebetween.

One of the more important features of the invention is involved in the relative positioning of the broiler 50 with respect to the angularly disposed firebox 28. Reference will now be had to FIGURE 14 of the drawings for an explanation of the theoretical considerations underlying the positioning of the broiler 50. If the only heat emanating from the firebox 28 were radiant heat, then all points lying in planes parallel to the firebox 28, such as the plane designated at 97, would be at substantially the same temperature. In order to insure uniform application of heat over all the exposed surface of the meat, the broiler 50 would then be positioned as indicated in dotted lines in FIGURE 14, i.e., parallel to the firebox 28 and with the spacing therebetween being determined by the desired cooking rate. However, the heating effect of convection currents must be considered since the cooker will be surrounded by air rather than operated in vacuo. Since the convection currents will tend to rise, points in the plane 97 near the top of the firebox 28 will receive heat due to both radiation and convection while points in the plane 97 near the bottom of the firebox 28 will receive only radiant heat. Consequently, if the broiler were to be positioned as shown in dotted lines in FIGURE 14, then the upper portions of the meat would receive more heat than the lower portions thereof and uniform cooking would not be obtained.

With an inclined firebox, such as the firebox 28, it will be readily apparent that the convection heating effect is cumulative toward the top of the firebox. That is to say, the farther a point is displaced along the plane 97 toward the top of the firebox 28, the greater will be the convection heating effect at that point. The net effect of the combination of the convective heat with the radiant heat emanating from the firebox 28 is to angularly displace the planes of constant temperature from the parallel position shown at 97 to the position shown at 99 where the plane of uniform heat is inclined at an angle to the firebox 28. Manifestly then, the broiler 50 must be disposed parallel to the plane 99 and not the plane 97 in order to insure uniform heating of the meat. This positioning is indicated in solid lines in FIGURE 14. Again the spacing between the broiler 50 and the firebox 28 will depend upon the desired cooking rate.

To resume the description of operation, the broiler 50 is disposed in a position substantially parallel to the plane 99 and is locked in this position by means of the nuts 60 and 61. The carriage is then moved toward the firebox (to the left in FIGURE 2) until the spacing appropriate to the desired cooking rate is obtained. Both the approximate angular position of the plane 99, and the spacing between the broiler 50 and the firebox 28 to obtain a desired cooking rate, are determined empirically as the result of experience. The carriage 40 is left in this position until the side of the meat exposed to the firebox 28 has been cooked to the desired extent. The nuts 61 are then loosened and the broiler 50 rotated through 180° when the nuts 61 are again tightened. This exposes the uncooked side of the meat and enables the cooking operation to be complete. When the meat is done, the carriage 40 is moved away from the firebox 28 and the cooked meat removed from the broiler 50 by reversing the aforedescribed procedure.

As the fire in the firebox 28 burns, some of the hot convection gases will pass through the perforations 32 into the chamber 37. From here, the gases will pass over and around the oven, in the directions indicated by the arrows in FIGURE 2, and through openings 100 formed in the rear wall 72 into the flue 79. The gases then will pass between the top of the flue 79 and the flue cover 82 to the atmosphere through spaces provided by lugs 101 which hold the cover 82 away from the top of the flue 79. In passing through the chamber 37 the hot gases will, of course, heat the walls 69 of the oven 67 thus elevating the temperature of the air within the oven. This effect will roast or bake any foods which have been placed in the oven.

The hot convection gases which rise from the firebox 28 will pass through the grille 85 and thus may be used to heat any cooking utensils which are placed on the grille. Since the convection gases will be much more concentrated on the portion of the grille 85 which overhangs the firebox, this front portion of the grille may be used for boiling, stewing and frying of foods. The rearward part of the grille 85, receiving far less hot convection gases than the front portion thereof, may be used for foods that require only warming or to maintain in a warm state, foods which have been previously cooked.

Should it be desired to use the cooking apparatus of the present invention for smoking meats, the flue cover 82 is pivoted to a vertical position to completely open the flue and the meats to be smoked are suspended within the flue 79 from the hooks 80. A wood fire, of an appropriate material such as hickory wood, is then kindled within the chamber 36 upon the grate 76. The damper 77 is adjusted as necessary in order to make the fire smoke properly. The draft entering the chamber 36 through the damper 77 will then carry the wood smoke up through the flue 79 and around the meat suspended from the hooks 80 to smoke the meat.

From the foregoing, it can be readily seen that a new and useful outdoor cooking apparatus is provided by the present invention. The various units of the present invention are capable of performing all of the more common cooking operations and even some which are of a more exotic nature. It is also apparent that the present invention precludes the necessity of cooking portions of an outdoor meal in more than one location and that means are provided for simultaneously carrying on a multiplicity of cooking operations without any interference between the various operations.

It will be noted that the principal portion of the cabinet is in the shape of a rectangular parallelepiped with the upper portions of the front wall and the adjacent portions of the top and side walls cut away to provide the sloping firebox area; and with the added smoke compartment of segmental cylindrical configuration if desired.

It is to be understood that the above described arrangements are simply illustrative of the principal features of the invention in a preferred embodiment thereof. Numerous other arrangements may be readily devised by those skilled in the art to obtain a similar apparatus which still embodies the inventive concepts of the present invention and falls within the spirt and scope thereof.

What is claimed is:

1. A cooking apparatus comprising a cabinet of the configuration of a modified rectangular parallelepiped having top and bottom walls, front and rear walls, and a pair of substantially parallel side walls, at least the upper portion of said front wall and the adjacent portions of the top and side walls being eliminated to provide an inclined sloping area facing in a forward and upward direction; a forwardly and upwardly opening firebox occupying said area to provide for the outward emission of heat by both radiation and convection; a carriage mounted for sliding movement in a substantially horizontal plane and in directions substantially perpendicular to the front and rear walls of the cabinet, a portion of said carriage disposed exteriorly of said cabinet and terminating at a point outwardly of and at the approximate level of said firebox, and a broiler rotatably carried by said end of said carriage adjacent said firebox, the combined sliding movement of said carriage and rotative movement of said broiler enabling the positioning of said broiler with respect to said firebox at selected ones of a plurality of distances therefrom and angles thereto, whereby said broiler may be made to occupy a plane of uniform heating which is the resultant of both convection and radiation from said firebox.

2. The cooking apparatus as set forth in claim 1 in which said carriage comprises a pair of laterally spaced parallel bars rigidly secured together and received for substantially horizontal movement within the cabinet, the forwardly projecting ends of said bars bent upwardly and rearwardly still in parallel relationship and terminating at about the level of the horizontal median line of the firebox, the broiler comprising a substantially planar grille pivoted on a horizontal axis between the ends of said bent carriage bars.

3. The cooking apparatus as set forth in claim 1 in which means are provided whereby the bottom of said inclined firebox transmits heat inwardly of said cabinet, and said cabinet is adapted to contain an oven compartment spaced from at least the top, front, bottom, and rear walls of the cabinet to permit the flow of heat around the oven compartment.

4. The cooking apparatus as set forth in claim 3 in which the bottom of the firebox is perforated for the flow of hot combustion gases into the cabinet and around the oven compartment, and a discharge opening is provided in the rear wall of the cabinet for said gases.

5. The cooking apparatus as set forth in claim 1 in which the firebox is in the form of a relatively shallow tray set into the cabinet, the side walls of which are comprised by the inclined edge portions of the side walls of the cabinet at the cut-away area of the modified parallelepiped.

6. The cooking apparatus as set forth in claim 5 in which the residual top wall portion of the cabinet of modified parallelepiped shape is troughed as a substantially horizontal continuation of the inclined firebox, and a level grille is secured above said wall portion and a portion of the firebox itself such as for warming, frying, stewing, or boiling purposes.

7. The cooking apparatus as set forth in claim 1 in which there is provided a substantially semi-cylindrical heat retainer member carried coaxially by said broiler.

8. The cooking apparatus as set forth in claim 2 in which rollers are provided in said cabinet upon which said bars move, and a drip pan is carried between said bars adjacent said bent portions thereof to underlie the broiler.

9. The cooking apparatus as set forth in claim 4 in which an ash tray is slidably mounted in an opening in the front wall of the cabinet immediately below the inclined firebox, to underlie and catch ashes from the openings in the bottom of said firebox.

References Cited in the file of this patent
UNITED STATES PATENTS

| | | |
|---|---|---|
| 493,801 | Weldon | Mar. 21, 1893 |
| 2,058,172 | Myers | Oct. 20, 1936 |
| 2,441,190 | Fuller | May 11, 1948 |
| 2,828,733 | Moore | Apr. 1, 1958 |
| 2,885,950 | Stoll | May 12, 1959 |